(12) United States Patent
Kuang et al.

(10) Patent No.: US 9,429,970 B2
(45) Date of Patent: Aug. 30, 2016

(54) POWER SUPPLY SYSTEM, ASSOCIATED CURRENT RIPPLE SUPPRESSION CIRCUIT AND METHOD

(71) Applicant: Chengdu Monolithic Power Systems Co., Ltd., Chengdu (CN)

(72) Inventors: Naixing Kuang, Hangzhou (CN); Jiaqi Yu, Hangzhou (CN); Bo Yu, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 20 days.

(21) Appl. No.: 14/038,671

(22) Filed: Sep. 26, 2013

(65) Prior Publication Data

US 2014/0085945 A1 Mar. 27, 2014

(30) Foreign Application Priority Data

Sep. 27, 2012 (CN) .......................... 2012 1 0364950

(51) Int. Cl.
*H05B 37/02* (2006.01)
*G05F 1/563* (2006.01)
*H02M 1/15* (2006.01)

(52) U.S. Cl.
CPC ............... *G05F 1/563* (2013.01); *H02M 1/15* (2013.01)

(58) Field of Classification Search
CPC ............ H02M 2001/0045; H02M 2001/0077; H02M 1/14; H02M 1/143; H02M 1/15; G05F 1/563; G05F 1/565; G05F 1/575; G05F 1/59; G05F 1/595
USPC ............ 315/172, 185 R, 189, 190, 191, 192, 315/193, 209 R, 224, 246–247, 291–311
See application file for complete search history.

(56) References Cited

U.S. PATENT DOCUMENTS

| | | | |
|---|---|---|---|
| 9,101,020 B2 * | 8/2015 | Wang ................. | H05B 33/0818 |
| 2005/0285649 A1 * | 12/2005 | Chun et al. .................... | 327/172 |
| 2006/0132061 A1 * | 6/2006 | McCormick et al. ........ | 315/291 |
| 2010/0079262 A1 * | 4/2010 | Van Laanen ............. | 340/310.12 |
| 2012/0306386 A1 * | 12/2012 | Oshima ...................... | 315/185 R |
| 2012/0326613 A1 * | 12/2012 | Liu ............................ | 315/185 R |

FOREIGN PATENT DOCUMENTS

CN 103066817 A 4/2013

* cited by examiner

*Primary Examiner* — Nguyen Tran (57) ABSTRACT

A power supply system has a current source configured to provide an output current, a load supplied by the current source, and a current ripple suppression circuit. The current ripple suppression circuit has a first end and a second end, wherein the first end of the current ripple suppression circuit is coupled to the load, and the second end of the current ripple suppression circuit is coupled to a reference ground; wherein the current ripple suppression circuit is configured to suppress the current ripple in the output current and adaptively adjust the output current of the current source at a predetermined current level.

20 Claims, 8 Drawing Sheets

POWER SUPPLY SYSTEM, ASSOCIATED CURRENT RIPPLE SUPPRESSION CIRCUIT AND METHOD

CROSS-REFERENCE TO RELATED APPLICATION(S)

This application claims the benefit of CN application No. 201210364950.3, filed on Sep. 27, 2012, and incorporated herein by reference.

TECHNICAL FIELD

The present invention generally relates to power supply system, and more particularly but not exclusively relates to LED power supply system with adaptive current ripple suppression.

BACKGROUND

Figure 1:
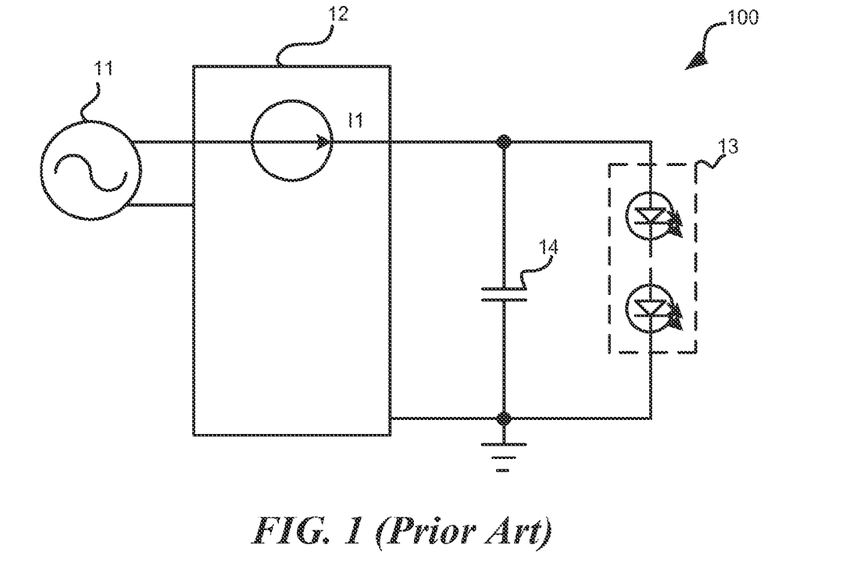
FIG. 1 shows a schematic diagram of a prior art LED power supply system.

When supplying a Light Emitting Diode (LED), the current flowing through the LED is typically regulated at a predetermined value. Thus the power source for supplying a LED can be deemed as a current source. FIG. 1 illustrates a schematic diagram of a prior art LED power supply system 100. The power supply system 100 adopts a converter 12 to convert an Alternating Current (AC) power source 11, e.g. a 220 Volts, 50 Hertz commercial power, into a power supply with predetermined current for supplying a LED string 13. In practice, the current source I1 usually contains relative large current ripple which may lower down the life of LED string 13. In order to suppress the current ripple, a large output capacitor 14 is usually adopted. However, large output capacitor 14 may greatly increase the size and cost of system 100.

Accordingly, an improved method is desired to overcome one or some of the above mentioned deficiencies.

SUMMARY

One embodiment of the present invention discloses a power supply system. The power supply system comprises: a current source having an output, wherein the output of the current source is configured to provide an output current; a load having a first end and a second end, wherein the first end of the load is coupled to the output of the current source, and wherein the current source is configured to supply the load with the output current; and a current ripple suppression circuit having a first end and a second end, wherein the first end of the current ripple suppression circuit is coupled to the second end of the load, and the second end of the current ripple suppression circuit is coupled to a reference ground; wherein the current ripple suppression circuit is configured to suppress the current ripple in the output current and adaptively adjust the output current of the current source at a predetermined current level.

Another embodiment of the present invention discloses a method of suppressing current ripple in a current source. The method comprises: coupling a linear device to the current source in series; obtaining an error amplifying signal between a voltage across the linear device and a reference voltage; converting the error amplifying signal into an interim voltage, wherein the interim voltage is lower than the reference voltage; coupling the interim voltage into a first input of an amplifier; coupling a signal indicating a current flowing through the linear device into a second input of the amplifier; and regulating the conduction resistance of the linear device by the output of the amplifier.

Yet another embodiment of the present invention discloses a current ripple suppression circuit for suppressing current ripple in a current source. The current ripple suppression circuit has a first end and second end, and the current ripple suppression circuit comprises: a transistor having a first end, a second end and a control end, wherein the first end of the transistor is coupled to the first end of the current ripple suppression circuit, and the second end of the transistor is coupled to the second end of the current ripple suppression circuit; and a control circuit having a first input, a second input and an output, wherein the first input of the control circuit is coupled to the first end of the transistor configured to receive a terminal voltage at the first end of the transistor, the second input of the control circuit is coupled to the second end of the transistor configured to receive a signal indicating the current flowing through the transistor, and the output of the control circuit is coupled to the control end of the transistor configured to adjust the resistance between the first end of the transistor and the second end of the transistor.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" may refer to direct connection, or indirect connection through a media such as a conductor having electric resistance. The conductor may also have parasitic parameters such as inductance or capacitance. The media may further be other component or device such as a transistor or a diode.

Figure 2:
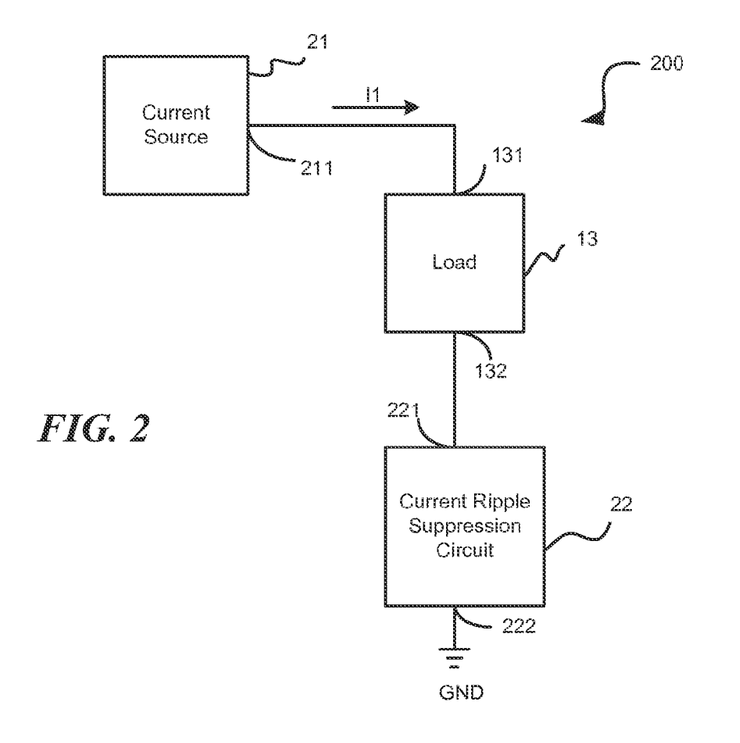
FIG. 2 shows a schematic block diagram of a power supply system 200 which comprises a current ripple suppression circuit 22 according to an embodiment of the present invention.

FIG. 2 illustrates a block diagram of a power supply system 200 according to an embodiment of the present invention. Power supply system 200 comprises a current source 21, a load 13 and a current ripple suppression circuit 22. Current source 21 has an output 211 configured to provide an output current I1. Current source 21 supplies power to load 13 with the output current I1. When without a current ripple suppression circuit 22 and a large output capacitor, current I1 outputted by current source 21 is a combination signal of a predetermined Direct Current (DC) current and a current ripple, and the current ripple may be large and lower down the life of load 13. Load 13 has a first end 131 and a second end 132, wherein the first end 131 is coupled to output 211 of current source 21. Current ripple suppression circuit 22 has a first end 221 and a second end 222, wherein the first end 221 is coupled to the second end 132 of load 13, and the second end 222 of current ripple suppression circuit 22 is coupled to a reference ground GND. Current ripple suppression circuit 22 suppresses the current ripple in output current I1 and adaptively adjusts current I1 at a predetermined current value.

Figure 3:
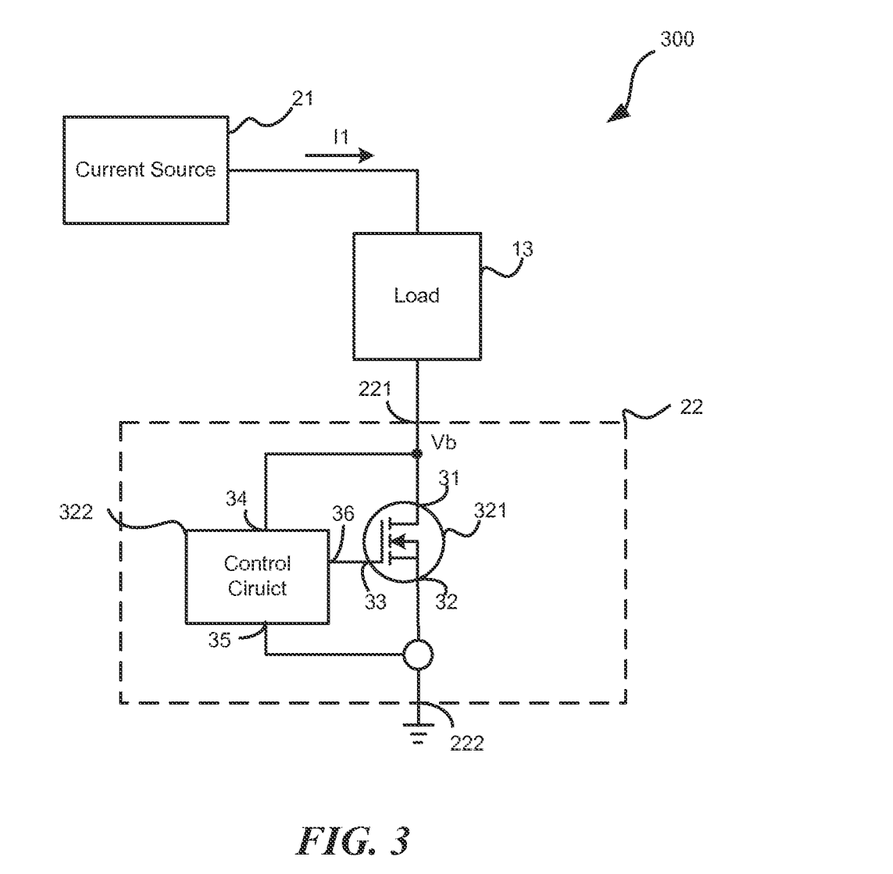
FIG. 3 shows a schematic diagram of a power supply system 300 where the current ripple suppression circuit 22 comprises a low drop out linear regulator according to an embodiment of the present invention.

FIG. 3 shows a schematic diagram of a power supply system 300 where current ripple suppression circuit 22 comprises a low drop out linear regulator according to an embodiment of the present invention. Power supply system 300 comprises a current source 21, a load 13 and a current ripple suppression circuit 22. Power supply system 300 is similar to system 200. In order to simplify the description without departing from the spirit of the present invention, some configurations that can be the same with system 200 are not to be described in detail. Current ripple suppression circuit 22 of power supply system 300 in FIG. 3 comprises a low drop out linear regulator which comprises a linear device 321. The resistance of linear device 321 has a linear region that can be regulated continuously by controlling the voltage at its control end 33. In the shown embodiment, linear device 321 comprises a Metal Oxide Semiconductor Field Effect Transistor (MOSFET). In some other embodiments, the linear device may comprise other type of semiconductor transistor. Current ripple suppression circuit 22 comprises transistor 321 and a control circuit 322. Transistor 321 comprises a first end 31, a second end 32 and the control end 33, wherein the first end 31 of transistor 321 is coupled to the first end 221 of current ripple suppression circuit 22, the second end 32 of transistor 321 is coupled to the second end 222 of current ripple suppression circuit 22, and the control end 33 of transistor 321 is coupled to control circuit 322. Control circuit 322 has a first end 34, a second end 35 and an output end 36, wherein the first end 34 is coupled to the first end 31 of transistor 321 configured to receive a terminal voltage Vb at the first end 31 of transistor 321, the second end 35 of control circuit 322 is coupled to the second end 32 of transistor 321 configured to receive a current signal indicating the current flowing through transistor 321, and output end 36 of control circuit 322 is coupled to control end 33 of transistor 321 configured to regulate the resistance between the first end 31 of transistor 321 and the second end 32 of transistor 321. In the shown embodiment, transistor 321 comprises a MOSFET. In another embodiment, transistor 321 comprises a Junction Field Effect Transistor (JFET). In yet another embodiment, transistor 321 comprises a Bipolar Junction Transistor (BJT). Control circuit 322 suppresses the current ripple via regulating the resistance of linear device 321 and adaptively limits current I1 at a predetermined value. In another embodiment, current ripple suppression circuit 22 comprises a linear device, but the control topology may be different from a low drop out linear regulator.

Figure 4:
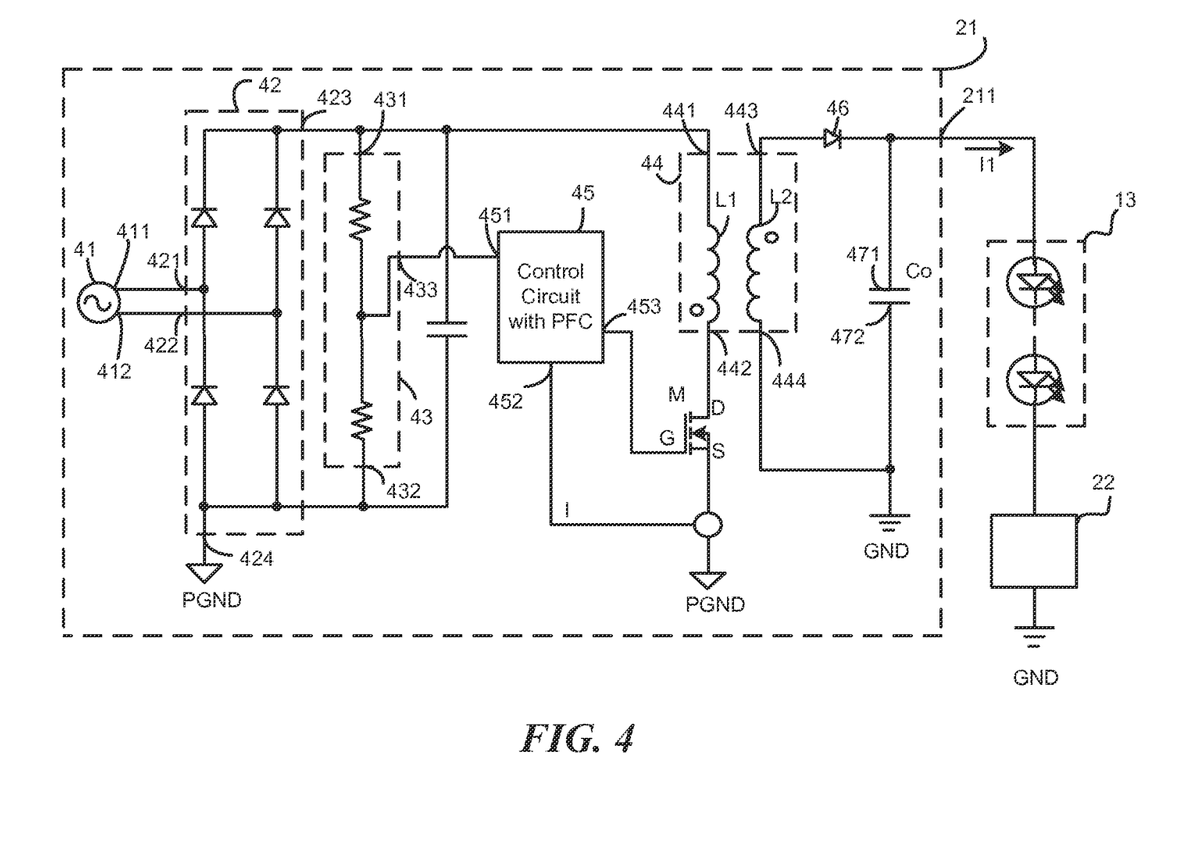
FIG. 4 shows a schematic diagram of a current source 21 for supplying a LED string 13 according to an embodiment of the present invention.

FIG. 4 illustrates a current source 21 for driving a load 13 according to an embodiment of the present invention. In FIG. 4, load 13 comprises a LED string comprising a plurality of LEDs coupled in series. Wherein, the anode of LED string 13 is coupled to output end 211 of current source 21, and the cathode of LED string 13 is coupled to current ripple suppression circuit 22. In one embodiment, the load may comprise only one LED. In some other embodiments, the load may comprise LEDs in any configuration or comprise other types of electronic devices. Current source 21 in FIG. 4 is used to convert an AC power source 41 into a DC current I1. In one embodiment, AC power source 41 comprises a commercial AC power source, e.g. a 220/110 Volts, 50 Hertz power source. Current source 21 comprises the AC power source 41, a rectification bridge 42, a resistor divider 43, a transformer 44, a switch M, a control circuit 45, a rectifier 46 and an output capacitor Co. Wherein AC power source 41 has a first end 411 and a second end 412. Rectification bridge 42 has a first input 421, a second input 422, a first output 423 and a second output 424, wherein the first input 421 of rectification bridge 42 is coupled to the first end 411 of AC power source 41, the second input 422 of rectification bridge 42 is coupled to the second end 412 of AC power source 41, and the second output 424 is coupled to a primary side reference ground PGND. Resistor divider 43 has a first end 431, a second end 432 and an output 433, wherein the first end 431 of resistor divider 43 is coupled to the first output 423 of rectification bridge 42, and the second end 432 of resistor divider 43 is coupled to the primary side reference ground PGND. Transformer 44 comprises a primary side winding L1 and a secondary side winding L2. The primary side winding L1 has a first end 441 and a second end 442, wherein the first end 441 of primary side winding L1 is coupled to the first output 423 of rectification bridge 42. The secondary side winding L2 has a first end 443 and a second 444, wherein the second end 444 of secondary side winding L2 is coupled to a secondary side reference ground GND. Switch M has a control end G, a first end D and a second end S, wherein the first end D of switch M is coupled to the second end 442 of primary side winding L1, and the second end S of switch M is coupled to primary side reference ground PGND. Control circuit 45 has a first input 451, a second input 452 and an output 453, wherein the first input 451 of control circuit 45 is coupled to output 433 of resistor divider 43, the second input 452 of control circuit 45 is coupled to the second end S of switch M configured to receive a signal indicating the current flowing through switch M, and the output 453 of control circuit 45 is coupled to control end G of switch M to control the ON and OFF of switch M. Rectifier 46 has an anode and a cathode, wherein the anode of rectifier 46 is coupled to the first end 443 of secondary side winding L2, and rectifier 46 rectifies the current flowing through the secondary side winding L2. Output capacitor Co has a first end 471 and a second end 472, wherein the first end 471 of capacitor Co is coupled to the cathode of rectifier 46, and the second end 472 of capacitor Co is coupled to reference ground GND. And the first end 471 of capacitor Co is further coupled to output 211 of current source 21 configured to provide the output current I1. In one embodiment, control circuit 45 is in current source control mode with Power Factor Correction (PFC), and current source control circuit 45 with PFC regulates the output current I1 at a predetermined value. In one embodiment, a secondary side rectifying diode is a low-side rectifier, wherein the anode of the diode is coupled to the reference ground GND, the cathode of the diode is coupled to the secondary side winding L2, and the output capacitor Co is coupled to the secondary side winding L2 to form an output of the current source 21. In order to not depart from the subject matter of the present invention, the configuration of the current source control circuit 45 with PFC control will not be described in detail. When without current ripple suppression circuit 22, output current I1 outputted by the current source 21 under current source control circuit 45 with PFC control would have undesired large current ripples. Adaptive current ripple suppression circuit 22 is used to suppress the current ripple and adaptively limit the current source 21 at a predetermined current value.

Figure 5:
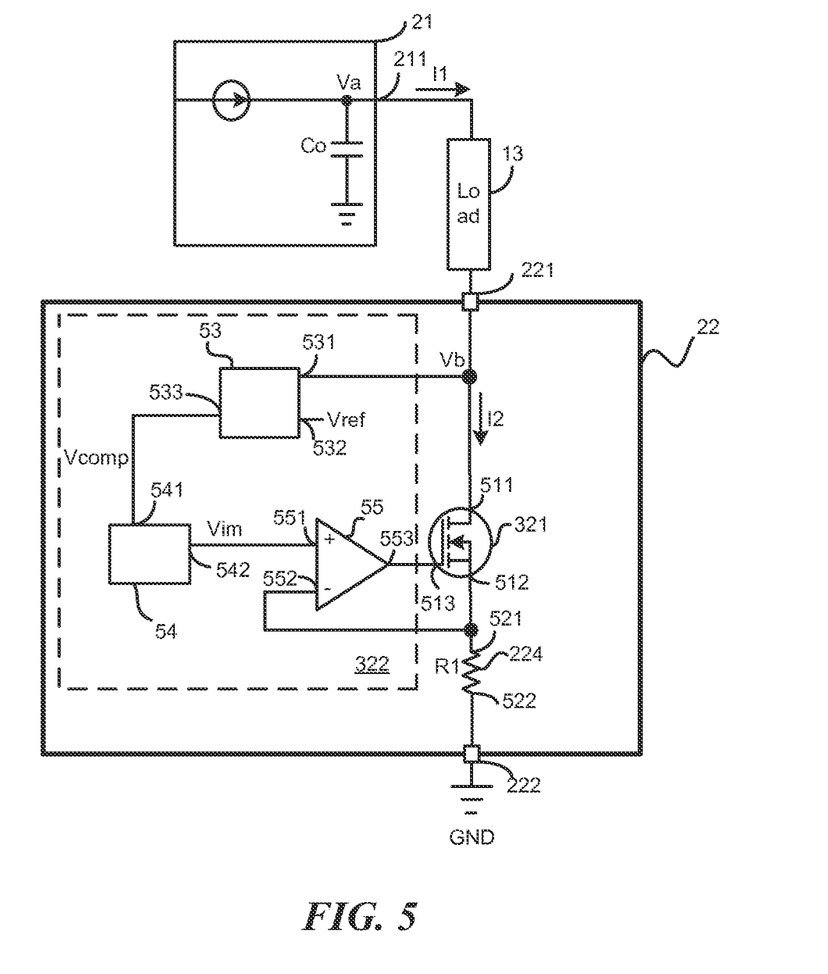
FIG. 5 shows a schematic diagram of a current ripple suppression circuit 22 according to an embodiment of the present invention.

FIG. 5 illustrates a block diagram of a current ripple suppression circuit 22 according to an embodiment of the present invention. Current ripple suppression circuit 22 comprises a transistor 321, a resistor 224 and a control circuit 322. Current ripple suppression circuit 22 externally has a first end 221 and a second end 222 for communicating with external circuits. Transistor 321 has a first end 511, a second end 512 and a control end 513, wherein the first end 511 is coupled to the first end 221 of current ripple suppression circuit 22. In the shown embodiment, transistor 321 comprises an N-type MOSFET, wherein the first end 511 of MOSFET 321 comprises a drain electrode, the second end 512 of MOSFET 321 comprises a source electrode, and the control end 513 of MOSFET 321 comprises a gate electrode. Resistor 224 has a first end 521 and a second end 522, wherein the first end 521 of resistor 224 is coupled to the second end 512 of transistor 321, and the second end 522 of resistor 224 is coupled to reference ground GND. Resistor 224 is used to detect the current flowing through transistor 321. Control circuit 322 comprises an error amplifying circuit 53, a converting circuit 54 and an amplifier 55. Error amplifying circuit 53 has a first input 531, a second input 532 and an output 533, wherein the first input 531 of error amplifying circuit 53 is coupled to the first end 511 of transistor 321 and the first end 221 of current ripple suppression circuit 22, the second input 532 of error amplifying circuit 53 is coupled to a reference voltage Vref, and the output 533 of error amplifying circuit 53 outputs an error amplifying signal Vcomp between terminal voltage Vb at the first end 511 of transistor 321 and the reference voltage Vref. Converting circuit 54 converts the error amplifying signal Vcomp into an interim voltage Vim. Amplifier 55 has a non-inverting input 551, an inverting input 552 and an output 553, wherein the non-inverting input 551 is coupled to output 542 of converting circuit 54 to receive interim voltage Vim, inverting input 552 of amplifier 55 is coupled to the first end 521 of resistor 224 to receive the signal indicating the current flowing through transistor 321, and output 553 of amplifier 55 is coupled to control end 513 of transistor 321 to regulate the conduction resistance of transistor 321.

Continuing with FIG. 5, transistor 321 has a linear resistance region, and the resistance between the first end 511 and the second end 512 of transistor 321 can be regulated continuously under the control of control circuit 322. Error amplifying circuit 53 detects the voltage difference between terminal voltage Vb and reference voltage Vref, and amplifies and integrates the difference between them to get the error amplifying signal Vcomp. Under the control of converting circuit 54 and amplifier 55, terminal voltage Vb would be finally limited to a stable voltage of Vref. Converting circuit 54 converts the error amplifying signal Vcomp into interim voltage Vim, and interim voltage Vim is lower than reference voltage Vref. Voltage Vc at the first end 521 of resistor 224 is proportional to current I2 which flows through transistor 321. Where I2=Vc/R1.

In one embodiment, when current I2 is smaller than the predetermined value of current I1, capacitor Co is charged. Accordingly, voltage Va at output 211 of current source 21 and terminal voltage Vb at the first end 221 of current ripple suppression circuit 22 increases. If voltage Vb is less than reference voltage Vref, the error amplifying signal Vcomp increases, interim voltage Vim decrease, the output voltage of amplifier 55 decreases, the conduction resistance of transistor 321 increases, and current I2 decreases. Current I2 continues to decrease during the period that terminal voltage Vb increases towards reference voltage Vref. And terminal voltage Vb would continue to increase. When terminal voltage Vb is higher than reference voltage Vref, error amplifying signal Vcomp decreases, the resistance of transistor 321 decreases, and current I2 increases accordingly. When current I2 increases to be higher than current I1, capacitor is discharged, voltages Va and Vb decreases and current I2 decreases accordingly. When the system enters into a stable status, terminal voltage Vb of current ripple suppression circuit 22 would be limited at reference voltage Vref, and current I2 would be limited at the predetermined value of output current I1 of current source 21. In a preferred embodiment, error amplifying circuit 53 has low bandwidth such that error amplifying signal Vcomp has low ripple; and amplifier 55 has high bandwidth such that it can respond to the change of error amplifying signal Vcomp quickly, and accordingly current I1 is stable and the current ripple is suppressed, and current I1 is adaptively adjusted at the predetermined value. Transistor 321 is preferably selected to have low resistance during stable status, and reference voltage Vref is preferably to have low value, and accordingly current ripple suppression circuit 22 has high efficiency. In some embodiments, reference voltage Vref is selected between the ranges of 0.2 Volts to 2 Volts.

In one embodiment, current ripple suppression circuit 22 is fabricated and integrated on a semiconductor substrate and is in form of semiconductor die 22. Semiconductor die 22 has a first lead 221 and a second lead 222. Where the first end 221 of current ripple suppression circuit 22 is coupled to or forms the first lead, and is further coupled to load 13. The second end 222 of current ripple suppression circuit 22 is coupled to or forms the second lead and is further coupled to the reference ground.

In one embodiment, current ripple suppression circuit 22 is fabricated in a package, and the first end 221 of current ripple suppression circuit 22 is coupled to or forms the first lead of the package, and the second end 222 of current ripple suppression circuit is coupled to or forms the second lead of the package. The package may be in any type, such as Quad Flat Package (QFP), Small Outline Package (SOP), etc.

Figure 6:
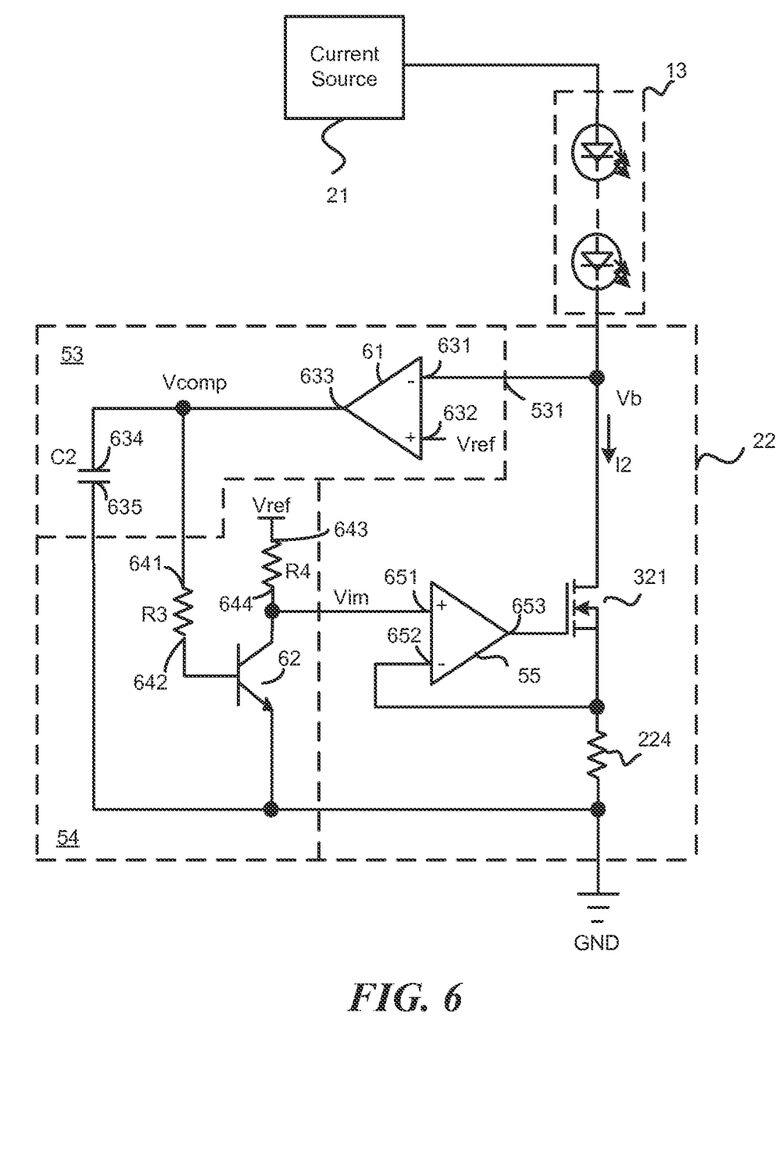
FIG. 6 shows a schematic diagram of a detailed current ripple suppression circuit 22 according to an embodiment of the present invention.

FIG. 6 illustrates a detailed current ripple suppression circuit 22 according to an embodiment of the present invention. Current ripple suppression circuit 22 comprises a transistor 321, a resistor 224, an error amplifying circuit 53, a converting circuit 54 and an amplifier 55. Where error amplifying circuit 53 comprises an error amplifier 61 and a capacitor C2. Error amplifier 61 has an inverting input 631, a non-inverting input 632 and an output 633. The inverting input 631 of error amplifier 61 is coupled to the first input 531 of error amplifying circuit 63 to receive the terminal Vb, and the non-inverting input 632 of error amplifier 61 receives a reference voltage Vref. Capacitor C2 has a first end 634 and a second end 635, wherein the first end 634 of capacitor C2 is coupled to output 633 of error amplifier 61 and converting circuit 54, and the second end 635 of capacitor C2 is coupled to reference ground GND. Error amplifier 61 amplifies and integrates the difference between terminal voltage Vb and reference voltage Vref, and charges capacitor C2 to generate the error amplifying signal Vcomp. In the embodiment shown in FIG. 6, current ripple suppression circuit 22 suppresses the current ripple in an output current which supplies LED string 13.

Continuing with FIG. 6, converting circuit 54 comprises a first resistor R3, a second resistor R4 and a BJT 62. Where a first end 641 of resistor R3 receives error amplifying signal Vcomp and a second end 642 of resistor R3 is coupled to a base of BJT 62. A first end of resistor R4 receives the reference voltage Vref, and a second end 644 of resistor R4 is coupled to a collector of BJT 62. The second end 644 of resistor R4 forms the output of converting circuit, is further coupled to amplifier 55 and provides interim voltage Vim. BJT 62 further has an emitter coupled to reference ground GND.

When terminal voltage Vb is lower than reference voltage Vref, capacitor C2 is charged and error amplifying signal Vcomp increases. The increase of Vcomp leads to increase of the current flowing through the collector and the emitter of BJT 62, and interim voltage Vim decreases. In the meantime, conduction resistance of transistor 321 increases, and current I2 decreases. Or otherwise, when terminal voltage Vb is higher than reference voltage Vref, current I2 increases.

In one embodiment, current ripple suppression 22 as shown in FIG. 6 is fabricated on a semiconductor substrate to form a semiconductor die. And in another embodiment, current ripple suppression circuit 22 as shown in FIG. 6 is fabricated in an electronic package.

Figure 7:
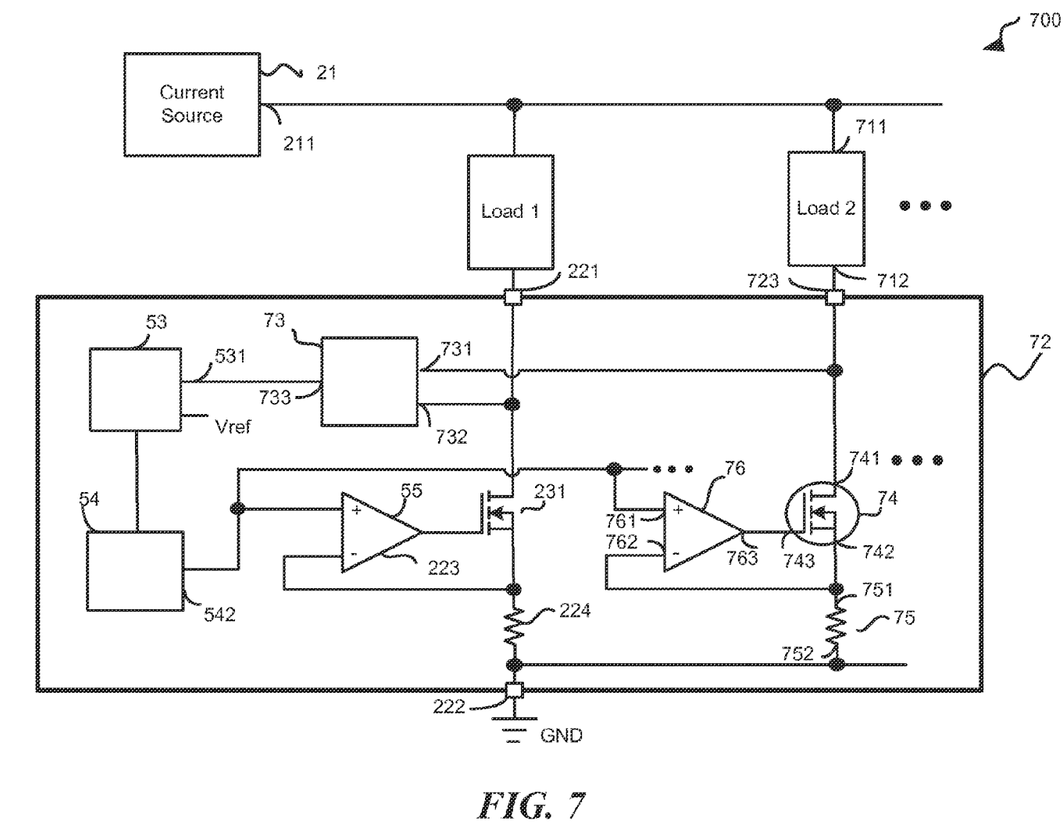
FIG. 7 illustrates a block diagram of a power supply system 700 for supplying a plurality of loads according to an embodiment of the present invention.

FIG. 7 illustrates a block diagram of a power supply system 700 for supplying a plurality of loads according to an embodiment of the present invention. Power supply system 700 comprises at least two loads, for example, load 1 and load 2. Each load is serially coupled to a linear device, and the serially coupled load 1 and transistor 321 and the serially coupled load 2 and transistor 72 are coupled in parallel. In the embodiment shown in FIG. 7, each linear device comprises a transistor of N-type MOSFET. Current ripple suppression circuit 72 has a first end 221, a second end 222 and a third end 723. Load 2 has a first end 711 and a second end 712, wherein the first end 711 is coupled to output 211 of current source 21, and current source 21 further provides power supply to load 2. The second end 712 of load 2 is coupled to the third end 723 of current ripple suppression circuit 72. In one embodiment, current ripple suppression circuit 72 is integrated on a semiconductor die, and semiconductor die 72 has a first lead, a second lead and a third lead, wherein the first end 221 of current ripple suppression circuit 72 is coupled to or forms the first lead and is coupled to load 1, the second end 222 of current ripple suppression circuit 7 is coupled to or forms the third lead and is coupled to reference ground GND, and the third end 723 of current ripple suppression circuit 72 is coupled to or forms the second lead and is coupled to load 2. In another embodiment, current ripple suppression circuit 72 is fabricated in an electronic package, wherein the first end 211 of current ripple suppression circuit 72 forms the first lead of the package, the second end 222 of current ripple suppression circuit 72 forms the third lead of the package, and the third end 723 of current ripple suppression circuit 72 forms the second lead of the package.

Continuing with FIG. 7, current ripple suppression circuit 72 comprises a minimum voltage selecting circuit 73, an error amplifying circuit 53, a converting circuit 54, a first transistor 321, a first resistor 224, a first amplifier 55, a second transistor 74, a second resistor 75 and a second amplifier 76. Minimum voltage selecting circuit 73 has a first input 731, a second input 732 and an output 733, wherein the first input 731 of minimum voltage selecting circuit 73 is coupled to the first end 221 of current ripple suppression circuit 72, and the second input 732 of minimum voltage selecting circuit 73 is coupled to the third end 723 of current ripple suppression circuit 72. Error amplifying circuit 53 has a first input 531 coupled to output 733 of minimum voltage selecting circuit 73. The coupling configuration of error amplifying circuit 53, converting circuit 54, the first amplifier 55, the first transistor 321 and the first resistor 224 of current ripple suppression circuit 72 in FIG. 7 may be the same as that of error amplifying circuit 53, converting circuit 54, amplifier 55, transistor 321 and resistor 224 of current ripple suppression circuit 22 in FIG. 5. The detailed configuration will not be described in order to simplify the description. The second transistor 74 has a first end 741, a second end 742 and a control end 743. In the shown embodiment, transistor 74 comprises a MOSFET, and the first end 741 comprises a drain, the second end 742 comprises a source and the control end 743 comprises a gate. The first end 741 of the second transistor 74 is coupled to the third end 723 of current ripple suppression circuit 72. The second resistor 75 has a first end 751 and a second 752, wherein the first end 751 of the second resistor 75 is coupled to the second end 742 of the second transistor 74, and the second end 752 of resistor 75 is coupled to the reference ground GND. The second amplifier 76 has a non-inverting input 761, an inverting input 762 and an output 763, wherein the non-inverting input 761 of the second amplifier 76 is coupled to output 542 of converting circuit 54, the inverting input 762 of the second amplifier 76 is coupled to the first end 751 of the second resistor 75, and output 763 of the second amplifier 76 is coupled to control end 743 of the second transistor 74 to make the second transistor 74 work in linear region. Power supply system 700 may further comprise more loads, and the loads are coupled in parallel. Each load is serially coupled to a linear device of the current ripple suppression circuit, and the control end of the linear device is controlled by an output of an amplifier. Furthermore, the non-inverting input of each amplifier is coupled to output 542 of converting circuit 54, and the inverting input of each amplifier receives a signal indicating the current flowing through the corresponding linear device.

Figure 8:
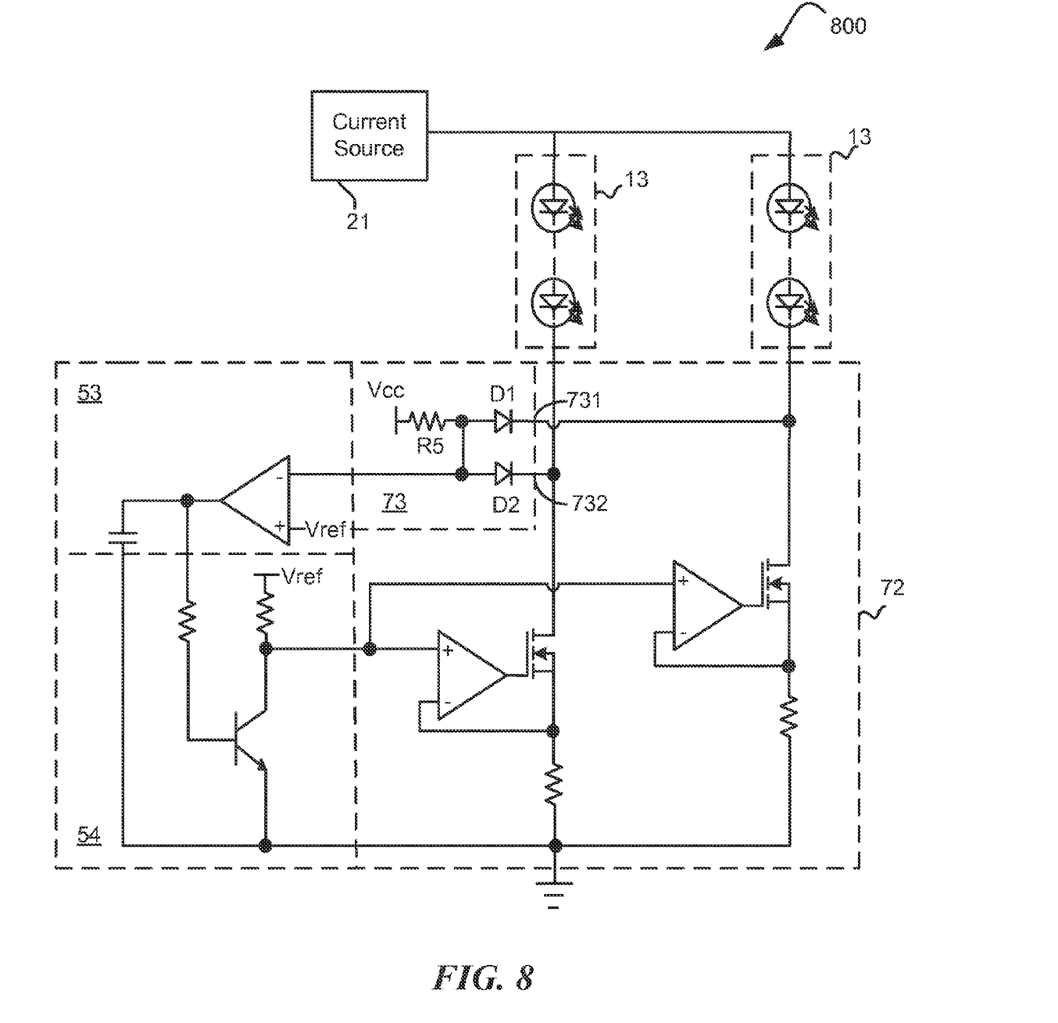
FIG. 8 shows a schematic diagram of a current ripple suppression circuit 72 in a power supply system 800 which supplies two loads according to an embodiment of the present invention.

FIG. 8 illustrates a detailed power supply system 800 supplying a plurality of loads according to an embodiment of the present invention. FIG. 8 shows a detailed example of power supply system 700 shown in FIG. 7. Wherein load 1 and load 2 of power supply system 700 each may comprise a LED string 13. Minimum voltage selecting circuit 73 comprises a first diode D1, a second diode D2 and a resistor R5. The first diode D1 has an anode and a cathode, where the cathode of diode D1 is coupled to the first input 731 of minimum voltage selecting circuit 73, and the anode of diode D1 is coupled to resistor R5. The second diode D2 has an anode and a cathode, where the cathode of diode D2 is coupled to the second input 732 of minimum voltage selecting circuit 73, and the anode is coupled to resistor R5. Resistor R5 has a first end coupled to the anode of the first diode D1, the anode of the second diode D2 and the error amplifying circuit 53, and has a second end coupled to a voltage source Vcc. Minimum voltage selecting circuit 73 selectively outputs the minimum voltage of the voltages across the plurality of linear devices. In the embodiment as shown in FIG. 8, error amplifying circuit 53 and converting circuit 54 of current ripple suppression circuit 72 has the same configuration as the error amplifying circuit 53 and converting circuit 54 in FIG. 6.

In one embodiment, current ripple suppression circuit 72 is integrated on a semiconductor die. And in another embodiment, current ripple suppression circuit 72 is fabricated in an electronic package.

Figure 9:
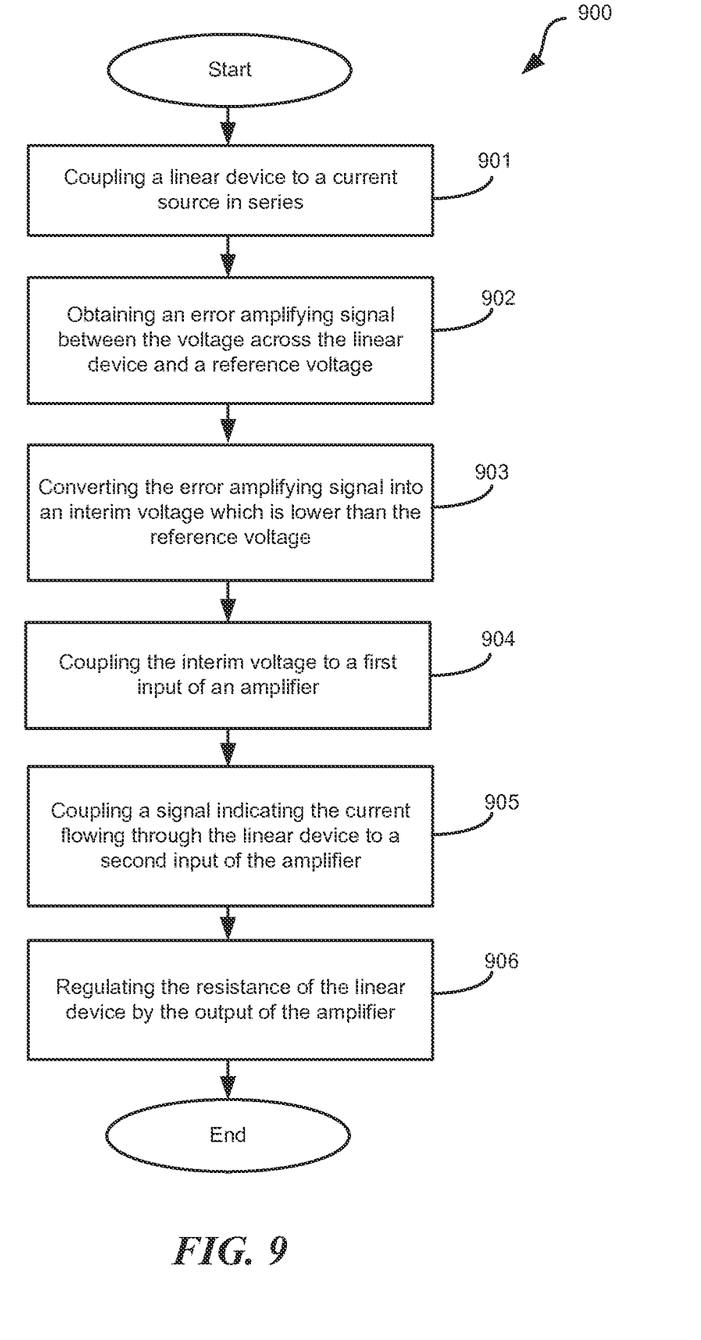
FIG. 9 shows a flow chart diagram of a method of adaptively suppressing the current ripple in a current source according to an embodiment of the present invention.

FIG. 9 illustrates a method 900 of adaptively suppressing current ripple in a current source according to an embodiment of the present invention. Method 900 comprises: in step 901, coupling a linear device to a current source in series, and the current source is adopted to supply a load; and in step 902, obtaining the voltage across the linear device, and comparing the voltage with a reference voltage Vref, amplifying and integrating the difference between the voltage and the reference voltage to obtain an error amplifying signal, for example, in FIG. 6, an error amplifying signal Vcomp is obtained by error amplifying circuit 53 which receives terminal voltage Vb and reference voltage Vref; in step 903, converting the error amplifying signal into an interim voltage which is lower than the reference voltage, for example, in FIG. 6, signal Vcomp is converted into interim voltage Vim which is less than reference voltage Vref; in step 904, coupling the interim voltage Vim into a first input of an amplifier, for example, the non-inverting input of an amplifier; in step 905, coupling a signal indicating the current flowing through the linear device into a second input of the amplifier, for example, coupling the voltage across sensing resistor 224 into the inverting input of amplifier 55; and in step 906, regulating the conduction resistance of the linear device by the output of the amplifier. In one embodiment, the linear device comprises an N-type MOSFET, the first input of the amplifier comprises a non-inverting input and the second input of the amplifier comprises an inverting input. Accordingly, the signal indicating the current flowing through the linear device is regulated at the interim voltage Vim. Interim voltage Vim increases when terminal voltage Vb is higher than the reference voltage Vref, and in the meantime, the current flowing through linear device 224 increases. Interim voltage Vim decreases when terminal voltage Vb is lower than the reference voltage, and in the meantime, the current flowing through the linear device decreases. When the current flowing through the linear device is less than the predetermined level of current source 21, terminal voltage Vb increases, and when the current flowing through the linear device is higher than the predetermined level of current source 21, terminal voltage Vb decreases. Therefore, in steady status, the current ripple suppression circuit will regulate the current flowing through the linear device and load at the predetermined current level of the current source.

While various embodiments have been described above, it should be understood that they have been presented by way of example only, and not limitation. Thus, the breadth and scope of a prefV1ed embodiment should not be limited by any of the above-described exemplary embodiments, but should be defined only in accordance with the following claims and their equivalents.

We claim:

1. A power supply system, comprising:
   a current source having an output, wherein the output of the current source is configured to provide an output current;
   a load having a first end and a second end, wherein the first end of the load is coupled to the output of the current source, and wherein the current source is configured to supply the load with the output current; and
   a current ripple suppression circuit having a first end and a second end, wherein the first end of the current ripple suppression circuit is coupled to the second end of the load, and the second end of the current ripple suppression circuit is coupled to a reference ground;
   wherein the current ripple suppression circuit is configured to suppress the current ripple in the output current and adaptively adjust the output current of the current source at a predetermined current level by comparing the voltage at the first end of the current ripple suppression circuit with a reference voltage, and wherein when the voltage at the first end of the current ripple suppression circuit is higher than the reference voltage, the current ripple suppression circuit is configured to increase a current flowing through the load, and when the voltage at the first end of the current ripple suppression circuit is lower than the reference voltage, the current ripple suppression circuit is configured to decrease the current flowing through the load.

2. The power supply system of claim 1, wherein the current ripple suppression circuit comprises a low drop out linear regulator.

3. The power supply system of claim 1, wherein the current ripple suppression circuit comprises:
   a transistor having a first end, a second end and a control end, wherein the first end of the transistor is coupled to the first end of the current ripple suppression circuit, and the second end of the transistor is coupled to the second end of the current ripple suppression circuit; and
   a control circuit having a first input, a second input and an output, wherein the first input of the control circuit is coupled to the first end of the transistor configured to receive the voltage at the first end of the transistor, the second input of the control circuit is coupled to the second end of the transistor configured to receive a signal indicating the current flowing through the transistor, and the output of the control circuit is coupled to the control end of the transistor configured to adjust the resistance between the first end of the transistor and the second end of the transistor.

4. The power supply system of claim 3, wherein the transistor comprises a Metal Oxide Semiconductor Filed Effect Transistor (MOSFET).

5. The power supply system of claim 1, wherein the current source comprises:

an AC power source having a first end and a second end;

a rectification bridge having a first input, a second input, a first output and a second output, wherein the first input of the rectification bridge is coupled to the first end of the AC power source, the second input of the rectification bridge is coupled to the second end of the AC power source, the first output of the rectification bridge is configured to provide a rectified voltage, and the second output of the rectification bridge is coupled to a primary side reference ground;

a resistor divider having a first end, a second end and an output, wherein the first end of the resistor divider is coupled to the first output of the rectification bridge, the second end of the resistor divider is coupled to the primary side reference ground, and the output of the resistor divider is configured to provide a divided voltage of the rectified voltage;

a transformer comprising a primary side winding and a secondary side winding, wherein the primary side winding has a first end and a second end, and wherein the first end of the primary side winding is coupled to the first output of the rectification bridge;

a switch having a first end, a second end and a control end, wherein the first end of the switch is coupled to the second end of the primary side winding and the second end of the switch is coupled to the primary side reference ground;

a control circuit having a first input, a second input and an output, wherein the first input of the control circuit is coupled to the output of the resistor divider, the second input of the control circuit is coupled to the second end of the switch configured to receive a signal indicating the current flowing through the switch, and the output of the control circuit is coupled to the control end of the switch configured to control the ON and OFF of the switch;

a rectifier coupled to the secondary side winding configured to rectify the current flowing through the secondary side winding; and an output capacitor having a first end and a second end, wherein the first end of the output capacitor is coupled to the secondary side winding and the output of the current source, and the second end of the output capacitor is coupled to a secondary side reference ground.

6. The power supply system of claim 1, wherein the load comprises a LED string having a plurality of LEDs coupled in series.

7. The power supply system of claim 1, wherein the current ripple suppression circuit comprises:

a transistor having a first end, a second end and a control end, wherein the first end of the transistor is coupled to the first end of the current ripple suppression circuit;

a resistor having a first end and a second end, wherein the first end of the resistor is coupled to the second end of the transistor, and the second end of the resistor is coupled to the reference ground;

an error amplifying circuit having a first input, a second input and an output, wherein the first input of the error amplifying circuit is coupled to the first end of the transistor to receive the voltage at the first end of the transistor, the second input of the error amplifying circuit is coupled to the reference voltage, the error amplifying circuit amplifies the difference between the voltage at the first end of the transistor and the reference voltage and further provides an error amplifying signal at the output;

a converting circuit having an input and an output, wherein the input of the converting circuit is coupled to the output of the error amplifying circuit, and the converting circuit is configured to convert the error amplifying signal into an interim voltage, and wherein the interim voltage is lower than the reference voltage; and an amplifier having a non-inverting input, an inverting input and an output, wherein the non-inverting input of the amplifier is coupled to the output of the converting circuit, the inverting input of the amplifier is coupled to the first end of the resistor, and the output of the amplifier is coupled to the control end of the transistor configured to control the conduction resistance of the transistor.

8. The power supply system of claim 7, wherein the error amplifying circuit comprises:

an error amplifier having an inverting input, a non-inverting input and an output, wherein the inverting input of the error amplifier is coupled to the first end of the transistor, and the non-inverting input of the error amplifier is coupled to the reference voltage; and a capacitor having a first end and a second end, wherein the first end of the capacitor is configured to provide the error amplifying signal and the second end of the capacitor is coupled to the reference ground.

9. The power supply system of claim 7, wherein the converting circuit comprises:

a first resistor having a first end and a second end, wherein the first end of the first resistor of the converting circuit is coupled to the input of the converting circuit;

a Bipolar Junction Transistor (BJT) having a base, an emitter and a collector, wherein the base of the BJT is coupled to the second end of the first resistor of the converting circuit, and the emitter of the BJT is coupled to the reference ground; and a second resistor having a first end and a second end, wherein the first end of the second resistor of the converting circuit is coupled to the collector of the BJT configured to provide the interim voltage, and the second end of the second resistor of the converting circuit is coupled to the reference voltage.

10. The power supply system of claim 1, further comprising a second load, the second load having a first end and a second end, wherein the first end of the second load is couple to the output of the current source, and the current source is configured to further supply the second load, and wherein the current ripple suppression circuit further comprises a third end, and the second end of the second load is coupled to the third end of the current ripple suppression circuit.

11. The power supply system of claim 10, wherein the current ripple suppression circuit comprises:

a minimum voltage selecting circuit having a first input, a second input and an output, wherein the first input of the minimum voltage selecting circuit is coupled to the first end of the current ripple suppression circuit, and the second input of the minimum voltage selecting circuit is coupled to the third end of the current ripple suppression circuit;

an error amplifying circuit having a first input, a second input and an output, wherein the first input of the error amplifying circuit is coupled to the output of the minimum voltage selecting circuit, the second input of the error amplifying circuit is coupled to the reference voltage and the output of the error amplifying circuit is configured to provide an error amplifying signal;

a converting circuit having an input and an output, wherein the input of the converting circuit is coupled to the output of the error amplifying circuit, and the converting circuit is configured to convert the error amplifying signal into an interim voltage, wherein the interim voltage is lower than the reference voltage;

a first transistor having a first end, a second end and a control end, wherein the first end of the first transistor is coupled to the first end of the current ripple suppression circuit;

a first resistor having a first end and a second end, wherein the first end of the first resistor is coupled to the second end of the first transistor, and the second end of the first resistor is coupled to the reference ground;

a first amplifier having a non-inverting input, an inverting input and an output, wherein the non-inverting input of the first amplifier is coupled to the output of the converting circuit, the inverting input of the first amplifier is coupled to the first end of the first resistor, and the output of the first amplifier is coupled to the control end of the first transistor configured to control the conduction resistance of the first transistor;

a second transistor having a first end, a second end and a control end, wherein the first end of the second transistor is coupled to the third end of the current ripple suppression circuit;

a second resistor having a first end and a second end, wherein the first end of the second resistor is coupled to the second end of the second transistor, and the second end of the second resistor is coupled to the reference ground; and a second amplifier having a non-inverting input, an inverting input and an output, wherein the non-inverting input of the second amplifier is coupled to the output of the converting circuit, the inverting input of the second amplifier is coupled to the first end of the second resistor, and the output of the second amplifier is coupled to the control end of the second transistor configured to control the conduction resistance of the second transistor.

12. The power supply system of claim 11, wherein the minimum voltage selecting circuit comprises:
a first diode having an anode and a cathode, wherein the cathode of the first diode is coupled to the first end of the current ripple suppression circuit;
a second diode having an anode and a cathode, wherein the cathode of the second diode is coupled to the third end of the current ripple suppression circuit; and
a resistor having a first end and a second end, wherein the first end of the resistor of the minimum voltage selecting circuit is coupled to the anode of the first diode and the anode of the second diode, the second end of the resistor of the minimum voltage selecting circuit is coupled to a voltage source, and the first end of the resistor of the minimum voltage selecting circuit is further coupled to the output of the minimum voltage selecting circuit.

13. A method of suppressing current ripple in a current source, the method comprising:
coupling a linear device to the current source in series;
obtaining an error amplifying signal by amplifying the difference between a voltage at a first end of the linear device and a reference voltage;
converting the error amplifying signal into an interim voltage, wherein the interim voltage is lower than the reference voltage;
coupling the interim voltage into a first input of an amplifier;
coupling a signal indicating a current flowing through the linear device into a second input of the amplifier; and
regulating the conduction resistance of the linear device by the output of the amplifier; wherein
when the voltage at the first end of the linear device is higher than the reference voltage, increasing the current flowing through the linear device, and when the voltage at the first end of the linear device is lower than the reference voltage, decreasing the current flowing through the linear device.

14. The method of claim 13, wherein the linear device comprises an N-type MOSFET, the first input of the amplifier comprises a non-inverting input of the amplifier and the second input of the amplifier comprises an inverting input of the amplifier.

15. A current ripple suppression circuit for suppressing current ripple in a current source, the current ripple suppression circuit having a first end and second end, the current ripple suppression circuit comprising:
a transistor having a first end, a second end and a control end, wherein the first end of the transistor is coupled to the first end of the current ripple suppression circuit, and the second end of the transistor is coupled to the second end of the current ripple suppression circuit; and
a control circuit having a first input, a second input and an output, wherein the first input of the control circuit is coupled to the first end of the transistor configured to receive a terminal voltage at the first end of the transistor, the second input of the control circuit is coupled to the second end of the transistor configured to receive a signal indicating the current flowing through the transistor, and the output of the control circuit is coupled to the control end of the transistor, and wherein the control circuit is configured to adjust the resistance between the first end of the transistor and the second end of the transistor by comparing the terminal voltage with a reference voltage, when the terminal voltage is higher than the reference voltage, the current ripple suppression circuit is configured to increase the current flowing through the transistor, and when the terminal voltage is lower than the reference voltage, the current ripple suppression circuit is configured to decrease the current flowing through the transistor.

16. The current ripple suppression circuit of claim 15, wherein the control circuit comprises:
an error amplifying circuit having a first input, a second input and an output, wherein the first input of the error amplifying circuit is coupled to the first end of the current ripple suppression circuit to receive the voltage at the first end of the current ripple suppression circuit, the second input of the error amplifying circuit is coupled to the reference voltage, the error amplifying circuit amplifies the difference between the voltage at the first end of the current ripple suppression circuit and the reference voltage and further provides an error amplifying signal at the output;
a converting circuit having an input and an output, wherein the input of the converting circuit is coupled to the output of the error amplifying circuit, the converting circuit is configured to convert the error amplifying signal into an interim voltage, wherein the interim voltage is lower than the reference voltage; and
an amplifier having a non-inverting input, an inverting input and an output, wherein the non-inverting input of the amplifier is coupled to the output of the converting circuit, the inverting input of the amplifier is coupled to the second end of the transistor configured to receive the signal indicating the current flowing through the transistor, and the output of the amplifier is coupled to the control end of the transistor configured to control the conduction resistance of the transistor.

17. The current ripple suppression circuit of claim 15, further comprising a resistor, wherein the resistor has a first end and a second end, wherein the first end of the resistor is coupled to the second end of the transistor, and the second end of the resistor is coupled to the second end of the current ripple suppression circuit, and wherein the resistor is configured to provide the signal indicating the current flowing through the transistor.

18. The current ripple suppression circuit of claim 17, is integrated on a semiconductor die, and wherein the semiconductor die has a first lead and a second lead, and further wherein the first end of the current ripple suppression circuit forms the first lead and is coupled to a load, and the second end of the current ripple suppression circuit forms the second lead and is coupled to a reference ground.

19. The current ripple suppression circuit of 16, wherein the error amplifying circuit comprises:
   an error amplifier having an inverting input, a non-inverting input and an output, wherein the inverting input of the error amplifier is coupled to the first end of the transistor, and the non-inverting input of the error amplifier is coupled to the reference voltage; and
   a capacitor having a first end and a second end, wherein the first end of the capacitor is configured to provide the error amplifying signal, and the second end of the capacitor is coupled to the second end of the current ripple suppression circuit.

20. The current ripple suppression circuit of claim 16, wherein the converting circuit comprises:
   a first resistor having a first end and a second end, wherein the first end of the first resistor of the converting circuit is coupled to the output of the error amplifying circuit;
   a BJT having a base, an emitter and a collector, wherein the base of the BJT is coupled to the second end of the first resistor of the converting circuit, and the emitter of the BJT is coupled to the second end of the current ripple suppression circuit; and
   a second resistor having a first end and a second end, wherein the first end of the second resistor of the converting circuit is coupled to the collector of the BJT and the output of the converting circuit, and the second end of the second resistor of the converting circuit is coupled to the reference voltage.

* * * * *